INVENTOR.
GAIL A. MASSEY

BY [signature] John F. Lawler
ATTORNEY

Sept. 17, 1968  G. A. MASSEY  3,401,590
OPTICAL COUPLER

Filed March 1, 1965  2 Sheets-Sheet 2

INVENTOR.
GAIL A. MASSEY

BY *John F. Lawler*
ATTORNEY

United States Patent Office 3,401,590
Patented Sept. 17, 1968

3,401,590
OPTICAL COUPLER
Gail A. Massey, Belmont, Calif., assignor to Sylvania Electric Products Inc., a corporation of Delaware
Filed Mar. 1, 1965, Ser. No. 436,065
3 Claims. (Cl. 88—14)

ABSTRACT OF THE DISCLOSURE

This optical coupler employs a birefringent prism or prisms and a light polarizer arranged to alter the direction of propagation of light passing in opposite directions through the prisms. The polarization angle of the light is related to the optic axes of the prisms so that the beams with different polarization angles are refracted differently and thus are separated from each other without substantial loss.

---

This invention relates to optical systems and more particularly to a coupler for controlling the direction of a light beam in an optical system.

In optical radar and other like systems, a single lens system is used for transmitting and receiving light beams in order to reduce alignment problems, cost and size. A beam of light from the source is directed through the lens system in one direction and the redirected or reflected light is passed through the same lens system to a receiver or other utilization apparatus. In order to use the same lens system, the direction of the beam of reflected light coupled from the lens system to the receiver must be different than that of the light beam from the source to the lens system. In the past this has been accomplished with a semitransparent or beamsplitter mirror placed between the light source and the lens system with the reflecting surfaces inclined to the direction of the beam. Such a mirror partially reflects and partially transmits incident light and generally results in loss of the energy emanating in one of the directions from this mirror.

An object of this invention is the provision of an optical beam direction control which eliminates the loss of light energy resulting from division of the intensity as the direction of the light is changed.

Another object is the provision of a simple optical coupler between a light source and an optical system for transmission and reception in which substantially all of the light from the source is transmitted and all of the received light is separated for efficient detection.

Another object is the provision of a birefringent coupler capable of making an optical system in which it is used theoretically 100% efficient.

Still another object is the provision of an optical directional coupler having utility as an optical circulator.

These objects are accomplished in accordance with this invention by refracting a light beam with a birefringent prism and changing the angle of polarization of light incident upon the prism to change the degree of refraction or bending. A birefringent prism or prisms and a light polarizer are physically arranged so that light passes through the prism in one direction with one angle of polarization and in the opposite direction with a different angle of polarization. The polarization angle of the light is related to the optic axis of the prism so as to achieve different degrees of bending through the prism in opposite directions. More than one prism may be employed for selectively separating light returned from a target with different angles of polarization and recombining the beams for processing in the receiver. Such multiprism systems may be used to provide an optical circulator.

These and other objects of the invention will become apparent from the following description of a preferred embodiment thereof, reference being had to the accompanying drawings in which.

Figure 1:
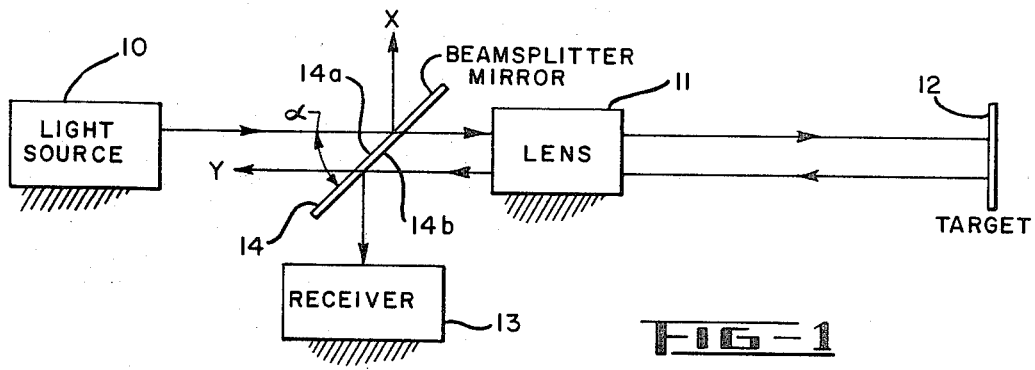
FIGURE 1 is a schematic diagram of a typical prior art optical system with a beamsplitter mirror.

Referring now to the drawings, a typical optical transmission and receiving system is illustrated in FIGURE 1 in simplified block form and comprises a light source 10, such as a laser, a lens system 11, a target 12 and a receiver 13. The relative positions of the light source, lens system and receiver are fixed and the direction of light from the source to the lens system and from the lens system to the receiver is controlled by a semitransparent beamsplitter mirror 14. Such a mirror has parallel partially reflecting surfaces 14a and 14b inclined at an angle $\alpha$ with the direction of incident light; light from source 10 to lens system 11 passes through the mirror and light from the lens system to receiver 14 is reflected by the surface 14b. The inefficiency of this system derives from the unused light X reflected from surface 14a and that portion Y of the light from the lens system which is transmitted through the mirror.

By way of example, if mirror 14 transmits one half of the incident beam and reflects the other half, the maximum optical efficiency of the system is limited to 25% because of the portions X and Y of the total light energy that are not utilized. In other words, only one quarter of the light energy developed by source 10 is available as useful light for the system.

Figure 2:
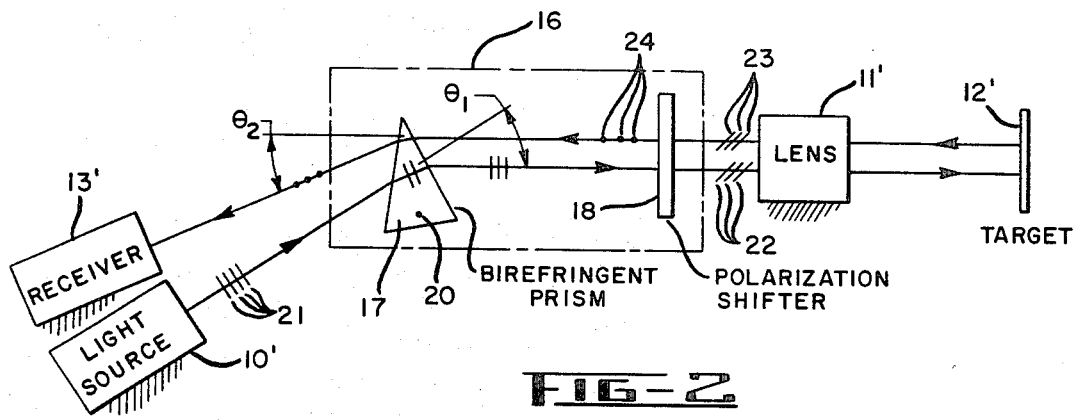
FIGURE 2 is a schematic diagram of an optical system with a coupler embodying this invention.

In accordance with this invention, linearly polarized light is transmitted from source 10', see FIGURE 2, to lens system 11' and from the lens system to receiver 13' through a coupler 16 comprising a birefringent prism 17 and a polarization shifter 18 such as a Faraday rotator or a quarterwave plate. Prism 17 may be formed from calcite or other crystal having birefringent properties and is oriented relative to source 10' so that the crystal optic axis 20 is transverse, preferably perpendicular to plane of polarization of light beam from the source.

In order to illustrate this relationship, the polarization of the light beam is indicated by transverse lines 21 and the optic axis 20 is represented as a point to indicate its direction into the plane of the paper. The index of refraction of prism 17 to the so polarized light beam is such that the beam bends through an angle $\theta_1$ as it passes through the prism. When the beam passes through polarization shifter 18, the polarization angle of the light is shifted 45°, if the Faraday rotator is used, as indicated by the inclined transverse lines 22. This beam then passes through lens system 11' and is reflected from target 12' through the lens system with no change in the angle of polarization as indicated by lines 23. Upon again passing through polarization shifter 18, the angle of polarization of the light beam is shifted 45° in the same direction so that the total shift of beam polarization is 90° as indicated by the dots 24. If the quarterwave plate is used, the light is circularly polarized in the lens system and at the target, and is converted to linear polarization at 90° on the return path through the quarterwave plate. As this beam passes through prism 17, it bends through an angle $\theta_2$ which is different from $\theta_1$ because of the different indexes of refraction exhibited by the prism to the orthogonally polarized beams. Accordingly, the reflected beam passes out of prism 17 in a direction that is divergent to the direction of the beam from source 10′ and goes to a receiver 13′ spaced from that source.

In an embodiment of the invention which was constructed and successfully operated, prism 17 comprised a crystal of calcite, polarization shifter 18 was a quarter-wave plate composed of mica and light source 10′ was a helium-neon laser operating at 6328 Angstroms. The angle $\theta_1$ was 30° and $\theta_2$ 20°.

Figure 3:
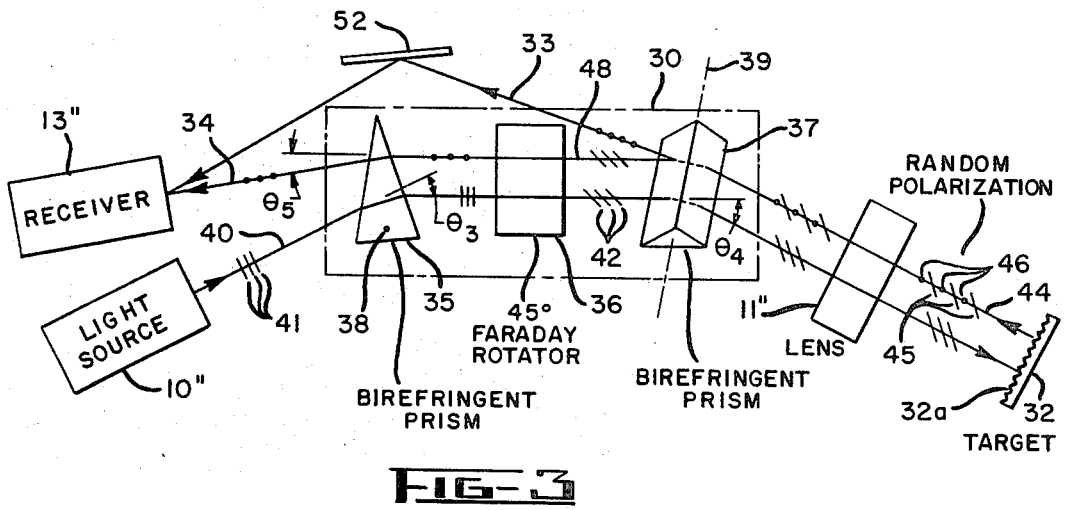
FIGURE 3 is a schematic diagram showing a modified form of the invention utilizing a plurality of birefringent prisms for separating differently polarized light received from a target and recombining it at the receiver.
Figure 4:
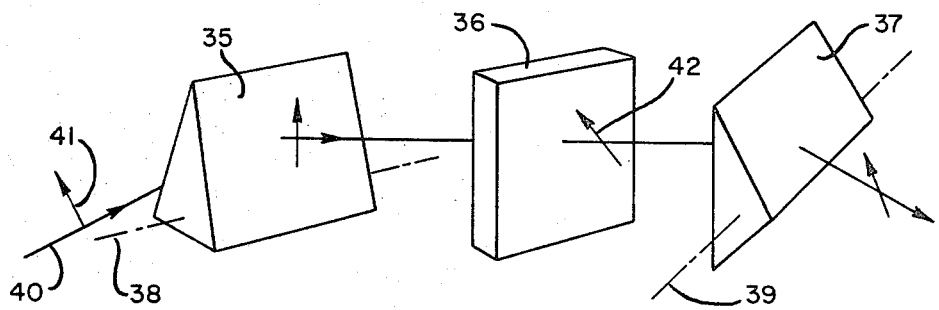
FIGURE 4 is a perspective view of the prisms and rotator shown in FIGURE 3.

It will be noted that the application to which the embodiment of FIGURE 2 is directed contemplates a target that reflects the light beam without altering the angle of polarization. There are certain applications wherein the reflecting body produces a change in the angle of polarization of the reflected light and for such applications the embodiment shown in FIGURES 3 and 4 operates with utility and advantage in accordance with the principle of the invention. The system comprises a light source 10″ which transmits a beam of linearly polarized light through a coupler 30 and a lens system 11″ to a reflecting target 32. Light reflected from target 32″ is randomly polarized because of the nature of the target, such as, for example, an irregular reflecting surface 32a. The reflected light is redirected through the lens system 11″ to the coupler which divides the single beam into two divergent beams 33 and 34 which are recombined at receiver 13″.

Coupler 30 comprises a birefringent prism 35, a 45° Faraday rotator 36, and a birefringent prism 37 aligned to receive the light beam generated by source 10″. Prism 35 has an optic axis 38 represented by a dot in FIGURE 3 to indicate its direction into the plane of the paper. Rotator 36, which may comprise a lead glass prism in a strong unidirectional magnetic field, is constructed to rotate the angle of polarization of light passing through it from prisms 35 and 37 by 45°. Prism 37 has an optic axis 39 and is oriented relative to prism 35 and rotator 36 so that optic axis 39 is perpendicular to the plane of polarization of light from the rotator. Thus, in the embodiment shown in FIGURE 3, the planes containing prism axes 38 and 39 intersect at a 45° angle. The angular relationship of the prism axes and the polarization of the incident light is further illustrated in FIGURE 4.

A beam 40 of coherent light from source 10″ and polarized as indicated by tranverse lines 41 is directed through prism 35 with its optic axis 38 perpendicular to direction of beam polarization. The beam is refracted by prism 35 and is bent through an angle $\theta_3$ but remains polarized in the same direction. Rotator 36 angularly displaces the direction of beam polarization by 45° (counterclockwise as viewed in FIGURE 4) as indicated by transverse line 42 and the beam is refracted by prism 37 so as to bend through an angle $\theta_4$ and pass through lens system 11″ to target 32 without change of polarization.

The reflected beam 44, due to the characteristics of the target, is randomly polarized and is represented by orthogonally polarized components in the form of transverse lines 45 (component having the same polarization as the incident beam) and dots 46 (component at right angle to component 45). This beam passes through lens 11″ to prism 37 which, because of its birefringent character, refracts the orthogonally polarized components of the beam differently so that beams 33 and 48 diverge as they pass out of the prism. Beams 33 and 48 comprise essentially all of the energy in reflected beam 44. As beam 48 passes through rotator 36, the angle of polarization is shifted another 45° in the same direction (i.e., counterclockwise as viewed in FIGURE 4) and the beam emerges with a 90° polarization shift compared to the polarization of the beam 40 from source 10″. As beam 48 passes through prism 35 the refraction is different than for the orthogonally polarized beam 40 and the beam is bent through an angle $\theta_5$ which, for example, is less than angle $\theta_3$.

Reflected beams 48 and 33, upon emergence from coupler 30, are directed toward receiver 13″, and to this end a mirror 52 is positioned relative to the coupler and receiver to reflect beam 33 to the receiver. Thus, beams 33 and 48 are recombined at the receiver which therefore receives substantially all of the energy of the beam reflected from target 32.

Figure 5:
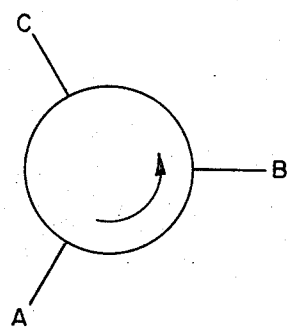
FIGURE 5 is a schematic representation of a non-reciprocal energy coupler or circulator.
Figure 6:
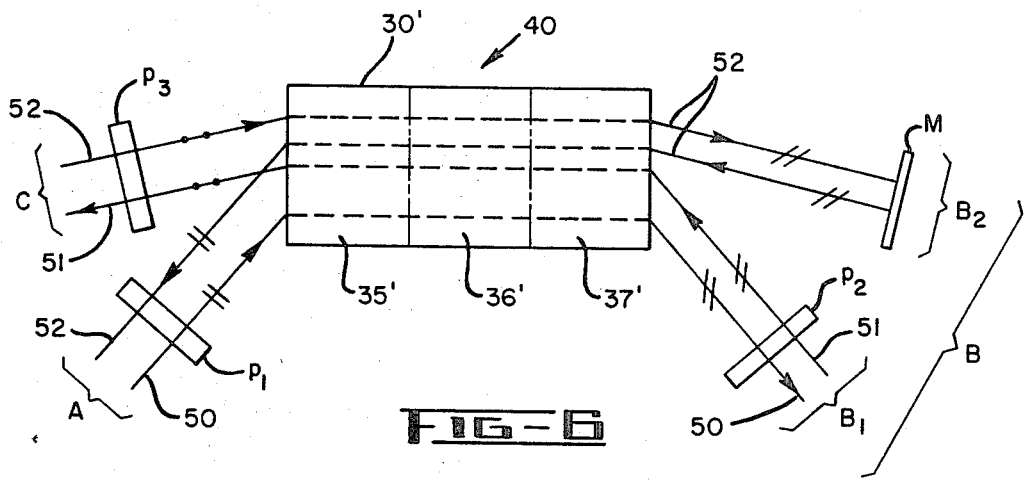
FIGURE 6 is a schematic representation of an optical circulator based on this invention.

It will be noted that the practice of the invention depends upon control of the polarization of the input light beam to the coupler, that is, the angle of polarization of the light directed into the coupler from the source is predetermined. Thus, control of the angle of emergence of the beam from the coupler is afforded by control of the polarization of light transmitted to the coupler. This principle of the invention may be extended to provide optical directional coupling analogous to that of a microwave circulator, represented schematically in FIGURE 5, wherein energy is non-reciprocably coupled between adjacent ports of the device in the direction of the arrow. Such an optical circulator 40 is illustrated in FIGURE 6 and comprises a coupler 30′ which, for example, is identical to coupler 30 described above and has prisms 35′ and 37′ and rotator 36′. Two ports A and C are at one end, the left end as viewed, of coupler 30′ and the other port B having sub-ports $B_1$ and $B_2$, is at the opposite end. These ports are equivalent to the ports A, B and C of the circulator shown in FIGURE 5. Sub-ports $B_1$ and $B_2$ are proximate to each other but are spacially separate since light beams passing from the coupler to the sub-ports diverge; however, for purposes of comparing the coupler to a microwave circulator, the two sub-ports are considered as one port.

In order to properly polarize the light entering the ports, the optical circulator 40 has light polarizers $p_1$ and $p_3$ at ports A and C, respectively, and polarizer $p_2$ at sub-port $B_1$ of port B. For example, light entering port A of coupler 30′ from polarizer $p_1$ is polarized vertically, as shown, light from polarizer $p_2$ at sub-port $B_1$ is at a polarization angle of 45° (counterclockwise as viewed from right to left in FIGURE 6) relative to vertical, and light from polarizer $p_3$ at port C is horizontally polarized. In order to couple light between ports C and A, a fully reflecting mirror M is provided at sub-port $B_2$ to redirect the beam through the coupler 30′.

In operation, a beam 50 of light directed into port A is polarized vertically, for example, by polarizer $p_1$ and emerges from prism 37′ with a counterclockwise polarization shift of 45° and passes through prism $p_2$ at sub-port $B_1$. Beam 51 entering port B through sub-port $B_1$ is polarized at 45° (counterclockwise from vertical) by polarizer $p_2$, emerges horizontally polarized from prism 35′ and passes through polarizer $p_3$ at port C. Light beam 52 entering port C is polarized horizontally by polarizer $p_3$, emerges from prism 37′ at sub-port $B_2$ with a polarization angle of 135° (counterclockwise from vertical), is reflected by mirror M to prism 37′ with the same polarization, and emerges vertically polarized from prism 35′ for passage through polarizer $p_1$ at port A.

What is claimed is:
1. An optical system comprising
   a source of a linearly polarized beam of light,
   a target adapted to reflect said light beam,
   a lens system between said light source and said target for focusing light propagating to and reflected from the target,
   a receiver spaced from said source for receiving said beam of reflected light from the lens system, and
   a coupler between the source and lens system for directing said reflected light beam to said receiver comprising
   a unitary prism of birefringent material having an optic axis and being so aligned with said source that the light beam from the source passing through the prism is refracted thereby and the direction of the beam is changed by a predetermined angle, and polarization changing means between and aligned with said prism and said lens system whereby source generated light from the prism and reflected light from the lens system pass through said means and the polarization of reflected light passing from said means to the prism is linear and orthogonal to the polarization of light from the prism to said means, said prism being oriented with its optic axis normal to the plane of polarization of light passing through the prism in one direction and refracting said beam of reflected light from said prism to the receiver through an angle different from said predetermined angle whereby the latter beam diverges from the beam of light from the source to the prism.

2. An optical system comprising a source of a linearly polarized beam of light, a target adapted to reflect said light beam, a lens system between said light source and said target for focusing light propagating to and reflected from the target, a receiver spaced from said source for receiving said beam of reflected light from the lens system, and a coupler between the source and lens system for directing said reflected light beam to said receiver comprising a first unitary prism of birefringent material having an optic axis and being so aligned with said source that the light beam from the source passes through and is refracted by the prism so that the direction of the beam is changed by a predetermined angle, a 45° Faraday rotator aligned with said first prism whereby source generated light from the prism passes through said rotator with a polarization shift of 45°, a second unitary prism of birefringent material having an optic axis and being so aligned with said rotator and said lens system that source generated light from said rotator and reflected light from the lens system pass through the second prism, said reflected light beam having orthogonally polarized components, one of said components being in a plane parallel to the optic axis of said second prism, said components of the reflected light dividing into first and second beams upon emergence from the second prism, said prisms being oriented relative to each other with planes containing the optic axes thereof intersecting at a 45° angle and said first prism being oriented with its optic axis normal to the plane of polarization of light passing from the source through the first prism in one direction and refracting said first beam of reflected light from said first prism to the receiver through an angle different from said predetermined angle whereby said first beam diverges from the beam of light from the source to the prism, and means for combining said first and second beams at the receiver.

3. The system according to claim 1 in which said polarization changing means is a quarterwave plate.

References Cited

UNITED STATES PATENTS

| | | |
|---|---|---|
| 1,939,088 | 12/1933 | Styer. |
| 3,267,804 | 8/1966 | Dillon _____ 350—157 X |
| 3,305,292 | 2/1967 | Miller _____ 350—150 |
| 3,329,474 | 7/1967 | Harris et al. _____ 350—157 X |

OTHER REFERENCES

West et al., "On the Properties . . . ," J.O.S.A., vol. 41, No. 12, December 1951, pp. 976–982.

JEWELL H. PEDERSEN, *Primary Examiner.*

W. A. SKLAR, *Assistant Examiner.*